United States Patent [19]

Sauret et al.

[11] 4,321,777

[45] Mar. 30, 1982

[54] COMPOSITE PANE HAVING A HIGH RESISTANCE TO IMPACTS

[75] Inventors: Jacques Sauret, Cormeilles en Vexin; Gerard Grosse, Paris, both of France

[73] Assignee: Brink's France S.A., Paris, France

[21] Appl. No.: 115,749

[22] Filed: Jan. 28, 1980

[30] Foreign Application Priority Data

Jan. 23, 1979 [FR] France ............................. 79 01596

[51] Int. Cl.³ .......................... E04B 1/62; E04C 1/42; B32B 17/10
[52] U.S. Cl. ...................................... 52/308; 52/399; 52/789; 89/36 A; 428/76; 428/412; 428/426; 428/437; 428/911
[58] Field of Search ................... 428/68, 76, 911, 912, 428/412, 426, 437; 89/36 A; 109/80; 52/788, 789, 399, 171, 308

[56] References Cited

U.S. PATENT DOCUMENTS

| 3,348,351 | 10/1967 | Citarel et al. | 52/399 X |
| 3,604,374 | 9/1971 | Matson et al. | 89/36 A X |
| 3,695,681 | 10/1972 | Dockery | 52/171 X |
| 4,104,427 | 8/1978 | Nolte et al. | 428/68 |
| 4,194,431 | 3/1980 | Markus et al. | 428/911 X |

Primary Examiner—George F. Lesmes
Assistant Examiner—Alexander S. Thomas
Attorney, Agent, or Firm—Irons and Sears

[57] ABSTRACT

This pane comprises at least one sheet of plastics material, for example a polycarbonate, which has a high resistance to impacts and is interposed between two sheets of glass or the like. A film of a transparent fluid is interposed between the sheet of plastics material and each adjacent sheet of glass. A sealing element for the fluid extends around the periphery of the pane.

Application as a bullet-proof pane to wind screens and windows of automobile vehicles, to glass, windows and doors of buildings, etc . . .

10 Claims, 1 Drawing Figure

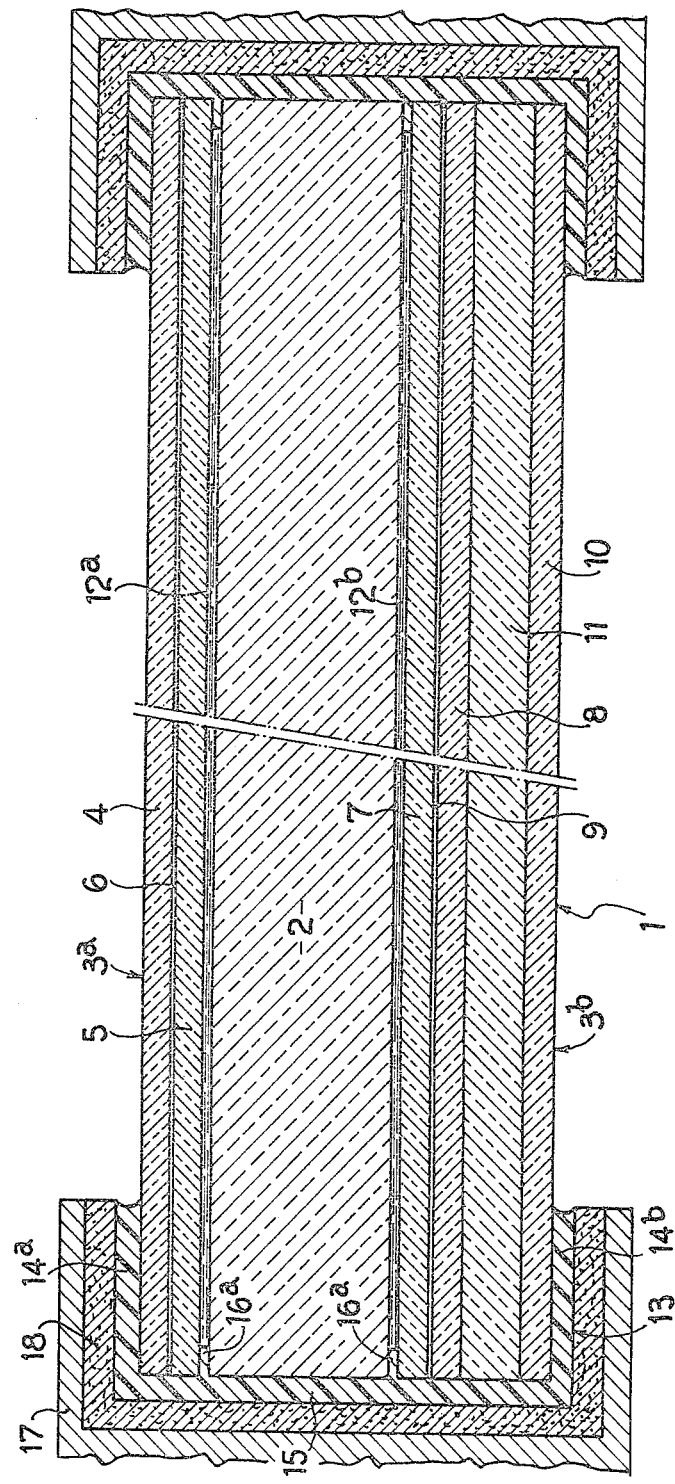

COMPOSITE PANE HAVING A HIGH RESISTANCE TO IMPACTS

DESCRIPTION

The present invention relates to a pane or glazing having a high resistance to impacts and in particular to projectiles fired from fire-arms.

It is already known to form such a window pane by means of a sheet of a polycarbonate interposed between two sheets of glass which are adhered to the sheet of polycarbonate and may be themselves part of a laminated pane, for example of the triplex type.

Owing to the very high resistance to impacts of polycarbonates, this window pane permits, for a given weight, a substantial improvement in the resistance to impacts over other bullet-proof panes or the like of known type. However, it has been found that this resistance to impacts of the composite pane having a polycarbonate sheet described hereinbefore is not as good as that which could be theoretically expected from the ballistic efficiency of polycarbonate. Further, the different coefficients of expansion of glass and polycarbonate results, in this known composite pane, in problems of behaviour at extreme temperatures which have not been solved up to the present time.

The object of the invention is therefore to provide a composite window pane having a high resistance to impacts, of the type comprising at least one sheet of transparent plastics material which resists impacts and is interposed between two sheets of glass or the like, which avoids the aforementioned drawbacks of the known composite window pane based on polycarbonate.

According to the invention, there is provided a window pane of the aforementioned type which comprises a film of a transparent fluid interposed between each face of said sheet of plastics material and the adjacent sheet of glass, and a sealing element extending round the periphery of the window pane.

According to a feature of the invention, said transparent fluid is a liquid, for example glycol.

Further features and advantages of the invention will be apparent from the ensuing description with reference to the accompanying drawing which is given solely by way of example and in which:

The single FIGURE is a cross-sectional view of a composite window pane having a high resistance to impacts according to the invention.

The pane 1 shown in the FIGURE comprises a relatively thick sheet 2 of a transparent impact resisting plastics material, for example a polycarbonate. The sheet 2 of plastics material is interposed between two laminated panes of known type 3a and 3b. The pane 3a is a triplex comprising two sheets of glass 4 and 5 which are assembled by a film 6 of polyvinyl butyral. The laminated sheet 3b comprises a triplex formed by two sheets of glass 7 and 8 which are assembled by a film 9 formed by a small number of sheets of polyvinyl butyral, an additional sheet of glass 10 being assembled with the sheet 8 of this triplex by a relatively thick layer 11 formed by a large number of sheets of polyvinyl butyral. The laminated pane 3b is also a known commercially-available product.

According to the invention, a film 12a, 12b of a transparent fluid is interposed between each face of the sheet 2 of plastics material and an adjacent sheet of glass 5 and 7 respectively. This fluid may be a paste or liquid such as glycol which has the advantage of having a very low freezing point and consequently allowing the use of the pane 1 under extreme climatic conditions. The fluid-tightness with respect to the fluid between the sheet 2 of plastics material and the adjacent sheet of glass 5 and 7 is achieved by means of a U-section frame 13 which constitutes an outer sealing element and extends around the pane 1 and has flanges 14a, 14b which are adhered to the outer faces of the laminated panes 3a and 3b respectively. The frame 13 further comprises a web 15 from which inwardly project two peripheral annular portions 16a, and 16b which constitute an inner sealing element and are each disposed between a marginal portion of the sheet 2 of plastics material and the facing marginal portion of the adjacent sheet of glass 5, 7 respectively. The annular portions 16a and 16b are secured to the corresponding marginal portions of the sheets of glass 5 and 7 by adhesion and the thickness of these annular portions is equal to, or less than, the films 12a and 12b of transparent fluid. Preferably, the frame 13 and the projecting annular portions 16a and 16b are in one piece and are produced from a plastics material which has a certain flexibility. With this embodiment of the sealing element, the sheet of plastics material 2 is not fixed directly to the adjacent sheets of glass 5 and 7 and this eliminates the problems related to the differential expansion of the sheet of plastics material and the adjacent sheets of glass which occur in the known pane described hereinbefore at the beginning of the present description. On the contrary, the arrangement of the sealing element according to the invention enables this differential expansion to occur without this resulting in a deformation of the sheet 2 of plastics material or of one or more sheets of glass making up laminated panes 3a and 3b, owing to the fact that the frame 13 is flexible and accommodates these differences in expansion. Further, although the annular portions 16a and 16b are not fixed to the sheet 2 of plastics material, the seal is perfectly achieved since, on one hand, these annular portions 16a, 16b are adhered to the sheets of glass 5 and 7 and, on the other hand, the flanges 14a, 14b of the frame 13 are adhered to the confronting faces of the laminated panes 3a and 3b, so that there can be no escape to the exterior of the transparent fluid of the films 12a and 12b.

Lastly, when the pane 1 is mounted in a fixed framework 17, a joint 18 of putty or mastic or the like is interposed between this framework 17 and the frame 13.

Apart from the fact that it solves the problems of behaviour under extreme climatic conditions, the pane according to the invention has the surprising advantage of having a ballistic efficiency or resistance which is a distinct improvement over that of the aforementioned known pane. Although the causes of this improvement are difficult to determine, it might be thought that the interposition of a film of fluid between the sheet of plastics material and the adjacent sheets of glass has for effect to isolate completely this sheet of plastics material and allow its ballistic properties to be fully taken advantage of, which is not the case in the known pane in which the sheet of polycarbonate is adhered to the adjacent sheets of glass.

Although a single embodiment of the invention has been described, it must be understood that many modifications may be made therein without departing from the scope of the invention. Thus, for example, the described sealing element may be replaced by a simple flexible peripheral sealing element of putty or mastic or the like disposed in the place of the annular portions 16a and 16b and respectively fixed to the sheet of plastics material 2 and to the sheets of glass 5 and 7. Further, the laminated panes 3a and 3b may have a different structure and, in the extreme case, these panes may be reduced in some applications to a single sheet of glass. Note that the term "glass" is here employed to designate any material such as glass, mirror or the like which is transparent and has a sufficiently hard surface so that it cannot be easily scratched.

The pane according to the invention may be employed in all applications where it is necessary to provide a transparent and light panel which is very resistant to impacts, for example for the construction of windscreens and window panes of automobile vehicles, windows or doors of buildings etc...

Having now described our invention what we claim as new and desire to secure by Letters Patent is:

1. In a composite window pane specifically designed to resist impacts such as impacts from projectiles fired from fire-arms, comprising two sheets of glass in substantially parallel planes, at least one transparent sheet of polycarbonate which resists impacts and is interposed between the two sheets of glass and is in a plane substantially parallel to said planes; the improvement comprising a film of a transparent liquid between each face of said sheet of polycarbonate and the adjacent one of said sheets of glass, and flexible sealing means comprising a U-section frame which extends around the pane to constitute an outer sealing element, said U-section frame comprising two annular outer flanges which are adhered against outer faces of said sheets of glass, and two peripheral annular portions which project inwardly of the frame and are respectfully sealingly engaged between marginal portions of the sheet of polycarbonate and marginal portions of said sheets of glass and allow relative movements between said sheet of polycarbonate and said sheets of glass in said substantially parallel planes, said frame being adhered only to said sheets of glass and not to said sheet of polycarbonate.

2. In a composite window pane specifically designed to resist impacts such as impacts from projectiles fired from fire-arms, comprising two sheets of glass in substantially parallel planes, at least one transparent sheet of plastics material which resists impacts and is interposed between the two sheets of glass and is in a plane substantially parallel to said planes; the improvement comprising a film of transparent liquid between each face of said sheet of plastics material and the adjacent one of said sheets of glass, and flexible sealing means comprising a U-section frame which extends around the pane to constitute an outer sealing element, said U-section frame comprising two annular flanges which are adhered against outer faces of said sheets of glass, and two peripheral annular portions which project inwardly of the frame and are respectively sealingly engaged between marginal portions of the sheet of plastics material and marginal portions of said sheets of glass and allow relative movements between said sheet of plastics material and said sheets of glass in said substantially parallel planes, said frame being adhered only to said sheets of glass and not to said sheet of plastics material.

3. A pane as claimed in claim 2, wherein said liquid is a paste.

4. A pane as claimed in claim 2, wherein said liquid is glycol.

5. A pane as claimed in claim 2, 3, 1 or 4, wherein at least one of said sheets of glass is part of a laminated pane.

6. A pane as claimed in claim 5, wherein said laminated pane comprises said sheet of glass and a second sheet of glass and a layer constituted by a small number of sheets of polyvinyl butyral interposed between and assembling said sheet of glass of the laminated pane and said second sheet of glass.

7. A pane as claimed in claim 6, wherein each of said sheets of glass surrounding said sheet of plastics material is part of a laminated pane.

8. A pane as claimed in claim 7, wherein one of said laminated panes further comprises a thick layer which is formed by a large number of sheets of polyvinyl butyral and is interposed between said second sheet of glass and a third sheet of glass.

9. A pane as claimed in claim 5, wherein each of said sheets of glass surrounding said sheet of plastics material is part of a laminated pane.

10. A pane as claimed in claim 2 or 1, wherein said frame and said projecting portions are in one piece and are made from a plastics material.

* * * * *